US008217629B2

(12) United States Patent
Pinto, IV et al.

(10) Patent No.: US 8,217,629 B2
(45) Date of Patent: Jul. 10, 2012

(54) BATTERY AND HYDROGEN FUEL CELL CHARGING REGULATOR

(75) Inventors: Nicholas W. Pinto, IV, Ferndale, MI (US); Paul W. Alexander, Ypsilanti, MI (US); Nancy L. Johnson, Northville, MI (US); Scott W. Jorgensen, Bloomfield Township, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 12/704,870

(22) Filed: Feb. 12, 2010

(65) Prior Publication Data
US 2011/0199056 A1 Aug. 18, 2011

(51) Int. Cl.
*H02J 7/04* (2006.01)
(52) U.S. Cl. .................... 320/152; 320/162
(58) Field of Classification Search ........... 320/152
See application file for complete search history.

(56) References Cited

U.S. PATENT DOCUMENTS

| 5,341,082 A * | 8/1994 | Lorenzen et al. | 320/165 |
| 5,952,815 A * | 9/1999 | Rouillard et al. | 320/116 |
| 2010/0164438 A1 * | 7/2010 | Saito | 320/152 |

* cited by examiner

*Primary Examiner* — M'Baye Diao
(74) *Attorney, Agent, or Firm* — Quinn Law Group, PLLC (57) ABSTRACT

A charging regulator assembly for an energy storing device includes an active material actuator configured to move a contact from a connected position permitting current transfer between the contact and a power bus into a disconnected position preventing current transfer between the contact and the power bus. The active material actuator is engaged in response to a temperature of the active material actuator rising above a pre-determined value. Moving the contact into the disconnected position prevents further current transfer into or out of the energy storing device, thereby preventing further heating of the energy storing device and preventing potential damage to the energy storing device form overheating.

20 Claims, 4 Drawing Sheets

BATTERY AND HYDROGEN FUEL CELL CHARGING REGULATOR

TECHNICAL FIELD

The invention generally relates to a regulator for controlling the temperature of a battery or a hydrogen fuel cell, and a method of controlling the temperature of the battery or the hydrogen fuel cell with the regulator.

BACKGROUND OF THE INVENTION

Energy storing devices, including but not limited to, batteries and hydrogen fuel cells, include one or more cells that may overheat during charging and/or during use. Overheating one or more of the cells of the energy storing device, whether during charging or during use, may damage the cell, potentially reducing the performance of the energy storing device and/or reducing the life expectancy of the energy storing device.

SUMMARY OF THE INVENTION

A regulator assembly for controlling a charging process for an energy storing device is disclosed. The regulator assembly includes a power bus that is configured for controlling a charging flow to the energy storing device. The regulator assembly further includes a contact. The contact is moveable between a connected position and a disconnected position. The contact is coupled to the power bus when in the connected position to permit the charging flow to the energy storing device. The contact is de-coupled from the power bus when in the disconnected position to prevent the charging flow to the energy storing device. The regulator assembly further includes a biasing device. The biasing device is coupled to the contact, and is configured for biasing the contact into the connected position. The regulator assembly further includes an actuator. The actuator is coupled to the contact, and is configured for moving the contact from one of the connected position and the disconnected position into the other of the connected position and the disconnected position. The actuator moves the contact when a feedback signal from the energy storing device is equal to or greater than a pre-determined value.

In another aspect of the invention, an energy storing device is disclosed. The energy storing device includes a housing, which defines a cell. The energy storing device further includes a regulator assembly that is coupled to the housing, and is configured for controlling a charging process of the cell. The regulator assembly includes a power bus. The power bus is configured for controlling a charging flow to the cell. The regulator assembly further includes a contact that is moveable between a connected position and a disconnected position. The contact is coupled to the power bus when in the connected position to permit the charging flow to the cell. The contact is de-coupled from the power bus when in the disconnected position to prevent the charging flow to the cell. The regulator assembly further includes a biasing device coupled to the contact. The biasing device is configured for biasing the contact into the connected position. The regulator assembly further includes an actuator that coupled to the contact. The actuator is configured for moving the contact from the connected position into the disconnected position. The actuator moves the contact when a feedback signal from the cell is equal to or greater than a pre-determined value. The actuator is configured to permit the biasing device to move the contact into the connected position from the disconnected position when the feedback signal from the cell is less than the pre-determined value.

In another aspect of the invention, a method of controlling a charging process for an energy storing device is disclosed. The energy storing device includes a regulator assembly having a power bus, a contact for engaging the power bus, and an active material actuator configured for moving the contact into and out of engagement with the power bus. The method includes sensing a feedback signal from the energy storing device with the active material actuator; and engaging the active material actuator to move the contact from a connected position to a disconnected position in response to the sensed feedback signal from the energy storing device rising to a level equal to or greater than a pre-determined value. The connected position permits a charging flow into the energy storing device. The disconnected position prevents the charging flow into the energy storing device.

Accordingly, the active material actuator senses the feedback signal from a cell of the energy storing device, such as a temperature of the cell and/or the energy storing device. When the feedback signal, e.g., the temperature of the active material actuator, rises to or above the pre-determined value in response to the temperature of the cell of the energy storing device increasing during charging, discharging or use, the active material actuator moves the contact from the connected position into the disconnected position. Moving the contact into the disconnected position prevents a charging flow, e.g., an electrical current, from flowing to or from the cell and/or the energy storing device, and thereby prevents the temperature of the cell from increasing further. Hysteretic behavior of the active material actuator transformation allows the temperature of the cell and/or the energy storing device to cool to a value below the pre-determined trigger level before the actuator moves the contact back into the connected position to restore the charging flow, thereby protecting the cell and the energy storing device from damage.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Referring to the Figures, wherein like numerals indicate like parts throughout the several views, an energy storing device is shown generally at 20. The energy storing device 20 may include, but is not limited to, one of a hydrogen storing device, an electricity storing device, such as a lithium ion battery, a lead acid battery or some other device capable of storing electricity; or some other device capable of storing a form of energy.

The energy storing device 20 includes a housing 22. The housing 22 defines at least one cell 24. Typically, the housing 22 defines a plurality of cells 24, with each of the cells 24 utilized for storing electricity. The energy storing device 20 may include any suitable shape, size and/or configuration suitable for the intended use of the energy storing device 20.

The charging process for batteries, and particularly for Li-ion batteries, is intrinsically endothermic (i.e. it absorbs heat from the environment), while its discharging process is exothermic (i.e. it rejects heat to the environment). However, the flow of heat liberated elsewhere in the system (e.g. Joule heating occurring at the contacts) into a cell 24 during charging makes the temperature of the cell 24 rise somewhat during charging as well. Most Li-ion batteries use one or more safety features, e.g. positive temperature coefficient materials that respond to the increase in temperature with an increase in resistance that prevent the cell 24 from discharging when it is overheated.

A promising approach to storing hydrogen is in hydride form in alloys. Hydrogen storage alloys (e.g. $LaNi_5$, FeTi, $Mg_2Ni$, etc) absorb and hold large amounts of hydrogen without compromising their own structure by forming hydrides. The process of absorbing hydrogen (i.e. charging) by such alloys is accompanied by a release of heat, while the process of releasing the stored hydrogen (i.e. discharging) is accompanied by absorption of heat. Thus, hydrogen storage units for fuel cells release heat primarily during charging.

Figure 1:
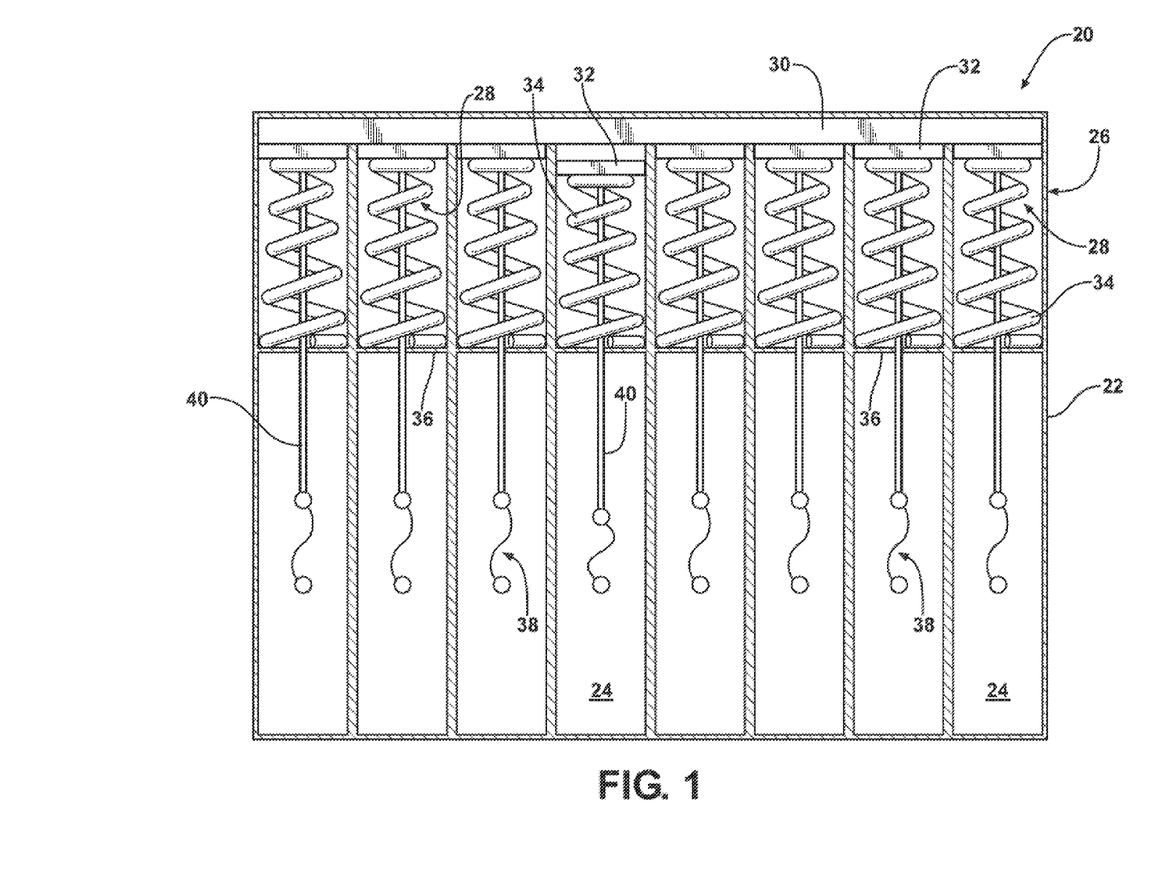
FIG. 1 is a schematic cross sectional view of an energy storing device having a charging regulator incorporated therein.

As shown in FIG. 1, the energy storing device 20 includes a regulator assembly 26. The regulator assembly 26 controls a charging process of the energy storing device 20. It should be appreciated that the charging process includes both charging of the energy storing device 20, and discharging of the energy storing device 20. The regulator assembly 26 is coupled to and/or integrally formed with the housing 22. The regulator assembly 26 is configured for controlling a temperature of the cell 24. More specifically, the regulator assembly 26 controls a charging flow to or from the cell 24 based upon a feedback signal, such as a temperature the cell 24. By controlling the charging flow to the cell 24, the temperature of the cell 24 may thereby be controlled as well. The regulator assembly 26 may include a plurality of sub-assemblies 28, with each sub-assembly 28 configured for regulating one of the cells 24 of the energy storing device 20. For example, if the energy storing device 20 includes an electricity storing device, the regulator assembly 26 controls the flow of current into and out of the energy storing device 20. Similarly, if the energy storing device 20 includes a hydrogen storing device, the regulator assembly 26 controls the flow of hydrogen into the energy storing device 20. Controlling the current flow into or out of, or the hydrogen flow into the energy storing device 20 thereby controls the temperature of the energy storing device 20. Accordingly, if one of the cells 24 of the energy storing device 20 overheats, the regulator assembly 26 may disrupt current flow into or out of, or hydrogen flow into the overheated cell 24 to allow the cell 24 to cool, thereby preventing damage to the cell 24 and the energy storing device 20.

The regulator assembly 26 includes a power bus 30. The power bus 30 is electrically insulated from the housing 22. The power bus 30 is configured for controlling a charging flow to and/or from the energy storing device 20. More specifically, if the energy storing device 20 includes an electricity storing device, then the power bus 30 is configured for conducting an electrical current into or out of each cell 24 of the energy storing device 20. It should be appreciated that the regulator assembly 26 may include a positive bus (shown) and a negative bus (not shown). Alternatively, if the energy storing device 20 includes a hydrogen storing device, then the power bus 30 is configured for conducting, i.e., providing, a flow of hydrogen to each cell 24 of the energy storing device 20.

The regulator assembly 26 further includes a contact 32. The contact 32 is moveable between a connected position and a disconnected position. When in the connected position, the contact 32 is electrically coupled to the power bus 30 to permit the charging flow to or from the energy storing device 20, e.g., an electric current between the power bus 30 and the contact 32. When in the disconnected position, the contact 32 is de-coupled from the power bus 30 to prevent the charging flow to or from the energy storing device. Accordingly, movement of the contact 32 from the connected position into the disconnected position interrupts the contact 32 between the power bus 30 and the contact 32, thereby preventing charging flow into or out of the cell 24. Similarly, movement of the contact 32 from the disconnected position into the connected position re-establishes the contact between the power bus 30 and the contact 32, thereby permitting the charging flow into or out of the cell 24.

The regulator assembly 26 further includes a biasing device 34. The biasing device 34 is coupled to the contact 32 and configured for biasing the contact 32 into the connected position. As shown, the biasing device 34 includes a coil spring. However, it should be appreciated that the biasing device 34 may include some other device capable of biasing the contact 32 into the connected position against the power bus 30. The biasing device 34 may include an electrical conducting material, which is configured for conducting electricity from the contact 32 into the cell 24. The electrical conducting material may include any suitable material capable of conducting an electrical current and suitable for disposition with the cell 24 of the energy storing device 20. For hydrogen storage devices, the biasing device 34 may not directly conduct the flow of hydrogen to or from the cell 24, rather, the biasing device 34 may control a flow element, e.g., a check valve, that regulates the flow of the hydrogen.

The regulator assembly 26 further includes a base 36. The base 36 is disposed opposite the contact 32, with the biasing device 34 disposed between the contact 32 and the base 36. The base 36 resists movement of the biasing device 34, and provides a stop against which the biasing device 34 reacts against to urge the contact 32 into the connected position.

The regulator assembly 26 further includes an actuator 38. The actuator 38 is coupled to the contact 32. More specifically, a connector 40 extends between and interconnects the actuator 38 and the contact 32. The connector 40 includes a non-conductive material to ensure no current is transferred from the contact 32 into the cell 24 and to the actuator 38.

The contact 32, the biasing device 34, the base 36, the actuator 38 and the connector 40 may be manufactured together as a unit to define the sub-assemblies 28, with each sub-assembly 28 regulating the temperature of one of the cells 24 of the energy storing device 20.

The actuator 38 is configured for moving the contact 32 from the connected position into the disconnected position when a feedback signal from the energy storing device 20 is equal to or greater than a pre-determined value. The feedback signal may include a temperature of the cell 24 and/or the energy storing device 20, a pH level of the cell 24 and/or the energy storing device 20, a resistance of the cell 24 and/or the energy storing device 20, or some other signal representative of the performance of the cell 24 and/or the energy storing device 20. Thus, the actuator 38 directly converts the feedback signal into mechanical work that results in the contact 32 being moved from the connected position to the disconnected position. The actuator 38 is also configured to permit the biasing device 34 to move the contact 32 into the connected position from the disconnected position when the feedback signal from the energy storing device 20 is less than the pre-determined value. Accordingly, if the feedback signal from the cell 24 rises above the pre-determined value, the actuator 38 engages and moves the contact 32 into the disconnected position to prevent current transfer into the cell 24, which prevents potential damage to the cell 24 due to excessive temperatures. As the feedback signal falls to below the pre-determined level, the actuator 38 disengages and permits the biasing device 34 to move the contact 32 back into engagement with the power bus 30 to restore current transfer into the cell 24, thereby reestablishing operation of the cell 24.

The actuator 38 includes an active material. The active material(s), which are described in greater detail below, may include, but are not limited to, a shape memory alloy, a thermo-regulated magnetic element, an electro active polymer a thermotropic liquid crystal elastomer or a shape changing polymer. Preferably, the active material is configured for moving the contact when heated or cooled to the pre-determined value. The pre-determined value may be set to any suitable temperature to avoid damage to the cell 24 and/or the energy storing device 20. The pre-determined value is dependent upon the specific type of, and materials used in the energy storing device 20. As such, the specific active material utilized for the actuator 38 may be chosen based upon the desired pre-determined value and the feedback signal. As shown, the active material contracts when heated too or above the pre-determined value, and expands, i.e., returns to an initial length, when cooled below the pre-determined value under the action of the biasing device 34. However, it should be appreciated that the actuator 38, and the active material of the actuator 38, may be configured in any suitable fashion capable of moving the contact 32 from the connected position into the disconnected position.

Figure 2:
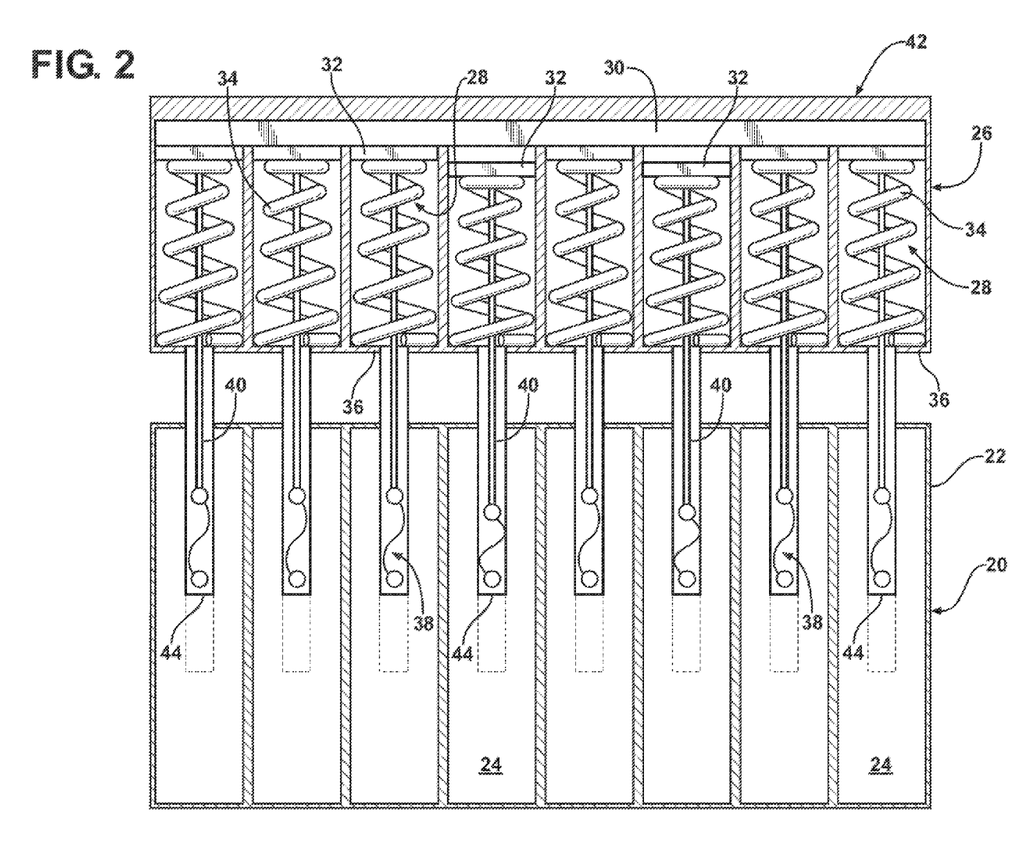
FIG. 2 is a schematic cross sectional view of a charging device having a charging regulator for charging an energy storing device.

Referring to FIG. 2, a charging station 42 for charging the energy storing device 20 is shown. The elements shown in FIG. 2 that are similar to the elements described in relation to FIG. 1 include the same reference numeral used in FIG. 1.

The charging station 42 includes the charging regulator assembly 26. Accordingly, in the embodiment shown in FIG. 2, the regulator assembly 26 is not integrally formed with the energy storing device 20. Rather, the regulator assembly 26 is configured to be releasably coupled to the energy storing device 20 while charging the energy storing device 20, and then removed from the energy storing device 20 once the energy storing device 20 is charged.

In order to facilitate the releasable coupling of the regulator assembly 26 to the energy storing device 20, each sub-assembly 28 of the regulator assembly 26 includes a probe 44. The probe 44 is attached to and extends from the base 36. The actuator 38 and at least part of the connector 40 are disposed within the probe 44. The probe 44 is configured for insertion into the cell 24 of the energy storing device 20. For thermally actuated active materials, the probe 44 senses the temperature of the cell 24, and conducts the temperature to the actuator 38. More specifically, as the temperature of the cell 24 rises, the probe 44 heats, thereby heating the actuator 38. Once the actuator 38 is heated to the pre-determined temperature value, the actuator 38 engages and moves the contact 32 into the disconnected position as described above. As the cell 24, and thereby the probe 44 cools, the actuator 38 cools, allowing the biasing device 34 to move the contact 32 back into the connected position as described above. For pH or ion concentration actuated active materials the probe 44 is fabricated of a material that allows transduction of these stimuli across the probe 44 walls.

In another aspect of the invention, a method of controlling a charging process for the energy storing device 20 is disclosed. As described above, the charging process may include both charging of the energy storing device 20 and/or discharging of the energy storing device 20. The energy storing device 20 may include an individual cell 24 of an energy storing device 20, or alternatively may include all of the cells 24 of the energy storing device 20. The charging process of the energy storing device 20 is controlled with the regulator assembly 26 described above. The method includes disposing the active material actuator 38 within or near the energy storing device 20 to sense the feedback signal from the energy storing device 20. As described above, the active material actuator 38 may be integrally formed with the energy storing device 20, or may be part of the charging station 42, in which case disposing the active material actuator 38 within the energy storing device 20 includes inserting the active material actuator 38 into the cell 24 of the energy storing device 20.

The method further includes sensing the feedback signal from the energy storing device 20. As described above, the active material actuator 38 is used to sense the feedback signal from the energy storing device 20, and more specifically, to sense the temperature of the cell 24 within which the active material actuator 38 is disposed. As the temperature of the cell 24 and/or the energy storing device 20 rises, the temperature of the active material actuator 38 rises. As the temperature of the cell 24 and/or the energy storing device 20 cools, the temperature of the active material actuator 38 cools as well.

The method further includes engaging the active material actuator 38 in response to the sensed feedback signal, e.g., the sensed temperature of the energy storing device 20, rising to a level equal to or greater than a pre-determined value. If the energy storing device includes an electricity storing device such as shown in the Figures, then the active material actuator 38 is engaged to move the contact 32 from the connected position, which permits current transfer between the power bus 30 and the contact 32, into the disconnected position, which prevents current transfer between the power bus 30 and the contact 32. Accordingly, once the temperature of the active material actuator 38 rises to a value equal to or greater than the pre-determined temperature value, the actuator 38 interrupts the electrical connection between the power bus 30 and the contact 32 to prevent current transfer into the cell 24 and/or energy storing device 20, thereby preventing the temperature of the cell 24 and/or the energy storing device 20 from rising further and potentially damaging the cell 24 and/or the energy storing device 20.

As described above, the active material actuator 38 may include, but is not limited to, a shape memory alloy material. Engaging the active material actuator 38 may include, but is not limited to contracting the active material actuator 38 in response to the temperature of the shape memory alloy material rising to a level equal to or greater than the pre-determined value. It should be appreciated that the active material actuator 38 move in a manner other than contraction when heated to the pre-determined temperature value, and that the active material actuator 38 may be configured to move the contact 32 in response to some other movement of the active material other than contraction.

The method further includes biasing the contact 32 from the disconnected position into the connected position with the biasing device 34 in response to the sensed feedback signal from, e.g., the sensed temperature of, the energy storing device 20 falling below the pre-determined value. Accordingly, once the temperature of the active material actuator 38 cools to a value below the pre-determined temperature value as controlled by the hysteresis curve of the shape memory alloy, the shape memory alloy returns to an initial shape, thereby allowing the biasing device 34 to bias the contact 32 back into the connected position to re-establish the charging flow into the cell 24 and/or the energy storing device 20.

The method may further include informing a vehicle or flow controller, prior to engaging the active material actuator 38, when the sensed feedback signal rises to within a range of the pre-determined value. The vehicle or flow controller may include a computer having a processor, memory, software and any other component necessary to control and communicate with the various systems of the vehicle. The regulator assembly 26 may be configured to be in communication with the vehicle or flow controller to provide information to the vehicle or flow controller. The vehicle or flow controller may be configured to control the energy storing device 20. For example, the vehicle or flow controller may be configured to control the rate at which the charging flow, e.g., an electrical current or a flow of hydrogen, is drawn from or supplied to the energy storing device 20. By controlling the rate of the charging flow, the vehicle or flow controller may control the temperature of the energy storing device 20. Accordingly, the information sent to the vehicle controller may indicate that the energy storing device 20 is approaching the pre-determined value, at which point the actuator 38 acts to disconnect the cell 24 and/or the energy storing device 20. As such, the vehicle controller may operate to control the energy storing device 20 to reduce the temperature thereof prior to the actuator 38 moving the contact 32 into the disconnected position, i.e., interrupting the charging flow.

For example, the feedback signal to the vehicle controller may include a resistance of the active material in the actuator 38. As the resistance of the active material increases to within a range, e.g., a pre-set percentage, of the pre-determined value, the vehicle controller may act to reduce the current flowing to the energy storing device 20. Alternatively, the active material of the actuator 38 may include a two stage active material, wherein the active material includes two stages. The first stage is triggered at a first temperature or resistance to inform the vehicle controller that the energy storing device 20 is nearing the pre-determined value. The second stage is triggered at a second temperature or resistance that corresponds with the pre-determined value.

Figure 3:
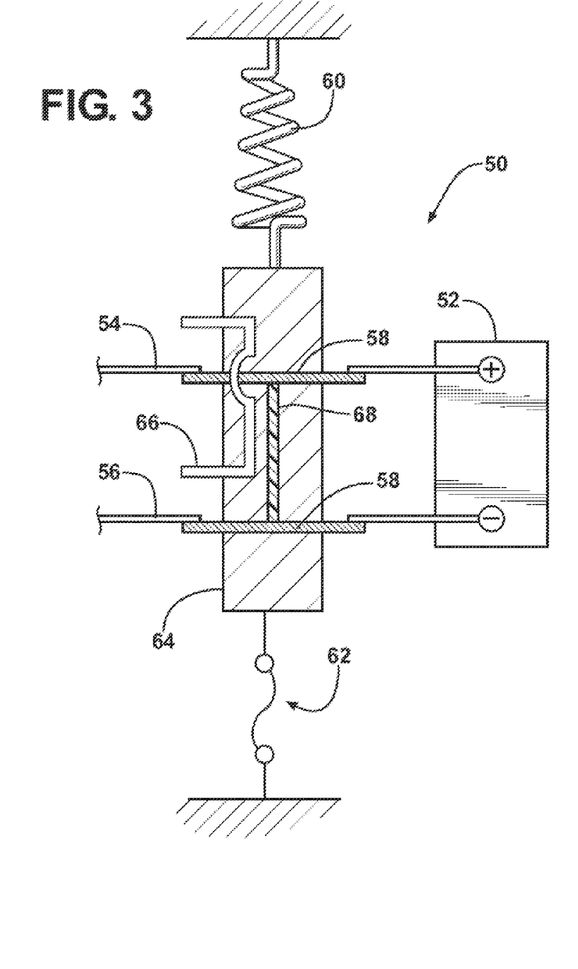
FIG. 3 is a schematic cross sectional view of an alternative embodiment of the charging regulator in a connected position.
Figure 4:
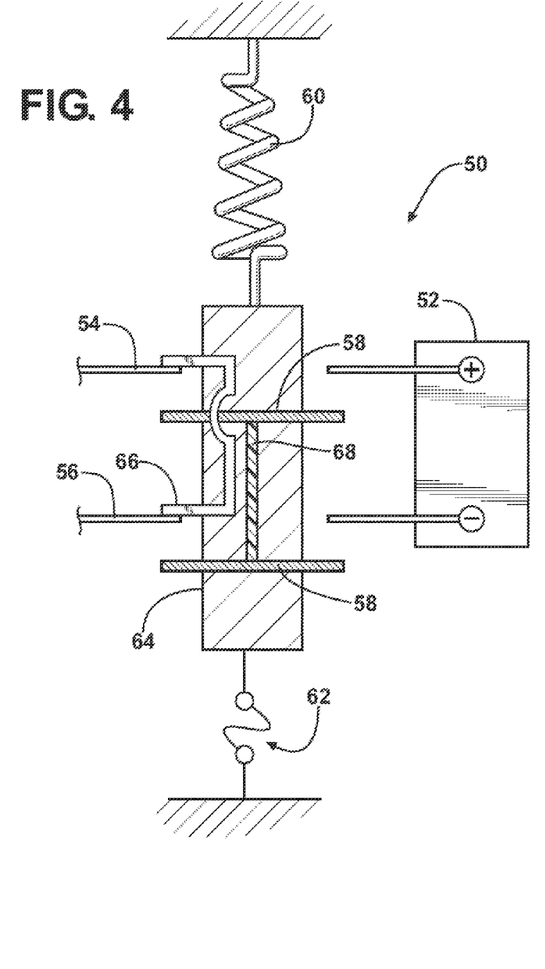
FIG. 4 is a schematic cross sectional view of the alternative embodiment of the charging regulator in a disconnected position.

Referring to FIGS. 3 and 4, an alternative embodiment of the regulator assembly is show at 50. The alternative embodiment of the regulator assembly 50 is particularly suited for controlling the temperature of a plurality of energy storing devices 52 disposed in series or parallel relative to each other. The alternative embodiment of the regulator assembly 50 includes a power bus. The power bus includes a positive terminal 54 and a negative terminal 56. The positive terminal 54 and the negative terminal 56 are configured for conducting, i.e., providing, an electrical current to each cell of the energy storing device 52. If the energy storing device 52 include a hydrogen storing device, then the positive terminal 54 and the negative terminal 56 correspond to the in and out flow conduits for the hydrogen.

The regulator assembly 50 further includes a contact 58. The contact 58 is moveable between a connected position, shown in FIG. 3, and a disconnected position, shown in FIG. 4. When in the connected position, the contact 58 electrically couples the charging bus to the cell terminals to enable current flow therebetween. When in the disconnected position, the contact 58 is replaced by an alternate contact 66 (described below), which disconnects the cell from the power bus 30 thereby preventing the electrical current from flowing into or out of the energy storing device 52. Similarly, movement of the contact 58 from the disconnected position into the connected position replaces the alternate contact 66 with contact 58, which re-establishes the current between the between the charging bus and the cell, thereby permitting the electrical current to flow into or out of the cell. In the case of a hydrogen storage device, the contact 58 and the alternate contact 66 are alternative flow conduits for hydrogen.

The regulator assembly 50 further includes a biasing device 60. The biasing device 60 is coupled to the electrically insulated connector 64 that carries both the contact 58 and the alternate contact 66. The biasing device 60 is configured for biasing the contact 58 into the connected position. The regulator assembly 50 further includes an active material actuator 62. The active material actuator 62 is coupled to the connector 64. More specifically, the connector 64 extends between and interconnects the active material actuator 62 and the biasing device 60, with the contact 58 being attached to the connector 64.

The active material actuator 62 is in thermal contact with the cell 24, and is configured for moving the contact 58 from the connected position into the disconnected position when a temperature of the energy storing device 52 is equal to or greater than a pre-determined value. The active material actuator 62 is also configured to permit the biasing device 60 to move the contact 58 into the connected position from the disconnected position when the temperature of the energy storing device 52 is less than the pre-determined value. Accordingly, if the temperature of the cell rises above the pre-determined value, the active material actuator 62 engages and moves the contact 58 into the disconnected position to prevent current transfer into and out of the energy storing device 52, which prevents potential damage to the energy storing device 52 due to excessive temperatures. As the energy storing device 52 cools, the active material actuator 62 disengages and permits the biasing device 60 to move the contact 58 back into engagement with the positive terminal 54 and the negative terminal 56 to restore current transfer into and out of the energy storing device 52, thereby reestablishing operation of the energy storing device 52. As described above, if the active material is activated by an alternative stimulus, i.e., a stimulus other than temperature, (e.g., pH level or ion concentration of the cell 24), then appropriate conveyors are provided to transfer the stimulus to the active material. For example, if the actuator 62 includes a shape changing polymer that contracts in response to the concentration of a particular species of ions (that are part of the charging/discharging process), then the shape changing polymer element is placed in intimate physical contact with the part of the cell that contains the ions.

The connector 64 further includes the alternate contact 66. The alternate contact 66 is configured for engaging the both the positive bus 54 and the negative bus 56 when the contact 58 is in the disconnected position. The electrical resistance offered by the alternate contact 66 to the flow of current between the positive terminal 54 and negative terminal 56 of the charging bus can be chosen to be a value that is consistent with the configuration of the cells and the charging circuit. Specifically, if the cell is being charged in series with neighboring cells by a constant voltage charging source, the alternate contact 66 is chosen to offer little or no resistance to the current flow to effectively 'short circuit' the overheated cell. If, on the other hand, the cell is being charged electrically in parallel with the neighboring cells by a constant voltage source, the alternate contact 66 is chosen to be electrically insulating so as to effectively 'open circuit' the overheated cell. If, it is unknown a priori whether the cell will be charged electrically in series or parallel with its neighboring cells, the electrical resistance offered by the alternate contact 66 may be chosen to have the value of the ideal (i.e. new cell, not overheated, during charging) resistance of the cell. Still other values of the electrical resistance of the alternate contact 66 may be established based on the exact configuration of the charging circuit and the location of the overheated cell in relation to the other cells. Accordingly, the alternate contact 66 modulates the electric current flow from the positive terminal 54 to the negative terminal 56 when the contact 58 is in the disconnected position, while isolating the electricity storing device 52 from the charging bus. In a similar vein for hydrogen storage devices, the alternate contact 66 may allow a particular cell to be completely bypassed, or blocked off or offer a modulated resistance to the flow of hydrogen that is typical of a new cell.

The connector 64 includes an electrically non-conductive insulating layer 68 surrounding and isolating the alternate contact 66. The non-conductive insulating layer 68 may include any suitable material for the specific application that prevents current transfer between the contact 58 and the alternate contact 66. For a hydrogen storage device, the contact 58 and the alternate contact 66 represent alternative flow conduits that do not interconnect.

Figure 5:
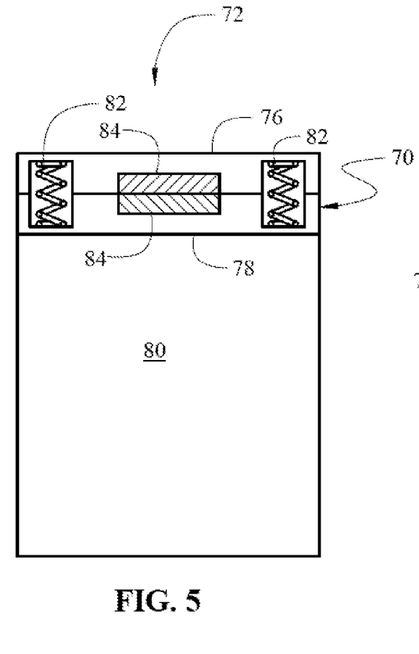
FIG. 5 is a schematic cross sectional view of a second alternative embodiment of the charging regulator in a connected position.
Figure 6:
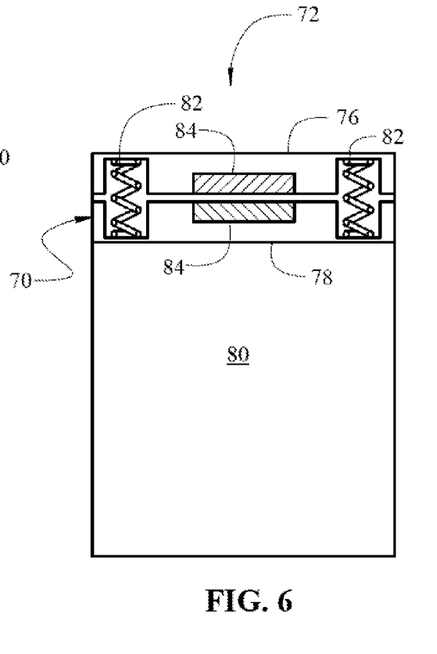
FIG. 6 is a schematic cross sectional view of the second alternative embodiment of the charging regulator in a disconnected position.

Referring to FIGS. 5 and 6, a second alternative embodiment of the charging regulator is shown schematically at 70. FIG. 5 shows the charging regulator 70 in the connected position, and FIG. 6 shows the charging regulator 70 in the disconnected position. The charging regulator 70 is incorporated into a cell 72 of an energy storing device. The charging regulator 70 includes an upper contact 76 disposed adjacent and opposite a lower contact 78. The upper contact 76 may be configured for electrical contact with a charge/discharge bus (not shown) for transmitting an electrical current to and/or from the cell 72. The lower contact 78 is in electrical and thermal contact with an electrolyte 80. The connected position permits current flow between the upper contact 76 and the lower contact 78. The disconnected position prevents current flow between the upper contact 76 and the lower contact 78. In the case of a hydrogen storage device, FIG. 5 represents an open flow connection between the cell 72 (connected to the lower contact 78) and the power bus (connected to the upper contact 76; whereas FIG. 6 represents the case when the flow connection is closed.

The charging regulator 70 further includes at least one, but preferably a pair, of bias springs 82. The bias springs 82 are interposed between the upper contact 76 and the lower contact 78 and tend to bias the upper contact 76 and the lower contact 78 apart from each other. The charging regulator 70 further includes an upper magnetic element 84 and a lower magnetic element 86. The lower magnetic element 86 includes a thermo-regulated magnetic element. The thermo-regulated magnetic element includes a Curie point, below which the thermo-regulated magnetic element is in a ferromagnetic state, and above which the thermo-regulated magnetic element is in a paramagnetic state. It should be appreciated that when the thermo-regulated magnetic element is in the ferro-magnetic state, the thermo-regulated magnetic element is attracted to another magnet, and when the thermo-regulated magnetic element is in the paramagnetic state, the thermo-regulated magnetic element is not attracted to another magnet.

The upper magnetic element 84 is attached to the upper contact 76, and the lower magnetic element 86 is attached to the lower contact 78. The upper magnetic element 84 and the lower magnetic element 86 generate a magnetic force therebetween that draws the upper contact 76 and the lower contact 78 together when the lower magnetic element 86 is in the ferro-magnetic state, which occurs when the temperature of the cell 72 is below the Curie point of the lower magnetic element 86. The upper magnetic element 84 may include a magnet having a Curie point much higher than the normal operating condition of the cell 72 to ensure that the upper magnetic element 84 continually operates in the ferro-magnetic state. The Curie point of the lower magnetic element 86, however, is set to be approximately equal to an overheating temperature of the cell 72. Accordingly, as shown in FIG. 5, when the temperature of the cell 72 is below the overheating temperature, the lower magnetic element 86 remains in the ferro-magnetic state, and the magnetic force generated between the upper magnetic element 84 and the lower magnetic element 86 overcomes the biasing force generated by the bias springs 82 to move the upper contact 76 and the lower contact 78 into the connected position. However, upon the temperature of the cell 72 rising to or above the overheating temperature, the temperature of the lower magnetic element 86 rises to or above the Curie point of the lower magnetic element, thereby causing the lower magnetic element 86 to transition into the paramagnetic state. Once the lower magnetic element 86 is in the paramagnetic state, the magnetic force between the upper magnetic contact 84 and the lower magnetic contact 86 is reduced or eliminated, thereby allowing the biasing force of the bias springs 82 to move the upper contact 76 and the lower contact into the disconnected position shown in FIG. 6. When the temperature of the cell 72 falls below the overheating temperature, the lower magnetic element 86 transforms back into the ferro-magnetic state, thereby restoring the magnetic force between the upper magnetic element 84 and the lower magnetic element 86, which causes the upper contact 76 and the lower contact 78 to move back into the connected position. For hydrogen storage devices, the attractive force between the lower magnetic element 86 and the upper magnetic element 84 overcomes the bias fore of the bias springs 82 to keep the flow channel between the cell 72 and the power bus open as long as the temperature of the cell 72, and hence of the lower magnetic element 86, the Curie point of the lower magnetic element 86. When the temperature of the cell 72 rises above its Curie point, the lower magnetic element 86 becomes paramagnetic and the biasing force of the bias springs 82 pushes the lower contact 78 away from the upper contact 76 to thereby close the flow channel between the cell 72 and the power bus.

Preferably, the active material of the active material actuator, 62 includes a shape memory alloy. However, the active material may include some other active material. Suitable active materials include, but are not limited to, shape memory alloys (SMA), electro active polymers, shape changing polymers, thermo-regulated magnetic elements.

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Thermotropic Liquid Crystal Elastomers (LCE) include Nematic liquid crystal elastomers, which comprise rigid rod-like molecular structural components, known as mesogens, that exhibit orientational order incorporated into the side chains and/or the backbone of an elastomer leading to the formation of side chain and/or main chain LCEs. A single crystal (or mono-domain) nematic LCE has all mesogens oriented at a fixed (on average) inclination with respect to a common axis known as the director. Thermotropic LCEs undergo thermally driven phase transtions. A long, thin and narrow specimen of a thermotropic single crystal main chain LCE will exhibit a base length, measured along the director, at temperatures below a characteristic temperature known as the $T\_n,i$ (nematic to isotropic phase transition temperature). The nematic ordering of the mesogens influences the conformations of the polymer chains in the specimen, and hence, its base length. Heating the specimen to a temperature above $T\_n,i$ produces a nematic to isotropic phase transition. The mesogens lose all or most of their medium to long range order in the isotropic phase which, therefore, comprises mesogens with randomly distributed orientations. The loss of order is reflected in the change in conformations of the polymer chains which, in turn, results in a change in macroscopic dimensions of the specimen. Typically, the length of the specimen in the isotropic phase will be less than its base length. Thus, thermotropic nematic LCEs can be used as thermally driven (contractile) actuators.

The behavior can be visualized as the mesogen order yielding a scaffolding that 'stretches' the polymer chain which is pinned to the scaffolding. When the ordering is destroyed, the scaffolding collapses (nearly completely) thereby, causing the polymer specimen to contract. In the isotropic phase, the LCE behaves like a common elastomer such as rubber.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable thermo-regulated magnetic elements include a curie point for the ferromagnetic material, which is the temperature above which the material becomes paramagnetic. A sample of this material will be attracted to a magnet as long as the material is below its Curie point. If the temperature of the material rises above the Curie point, it will become paramagnetic and will no longer be attracted to the magnet. When the material cools to below its Curie point, it will revert back to its ferro-magnetic state and will be attracted to the magnet again. This 'thermo-regulation' behavior can be used to design battery contacts and flow channels that respond to a rise in cell temperature by taking action to counteract the temperature rise.

Two things are essential in the chosen thermo-regulated ferro-magnetic material. First, the Curie point should either coincide with the critical temperature needed for the battery application or the material's Curie point should be adjustable by varying its composition. Second, the material should respond to heat generated only within the cell (i.e. there should be no other parasitic heating mechanisms such as eddy current heating). The Curie point of a class of ferro-magnetic materials: Nickel zinc ferrites [$Ni_{(1-x)}Zn_xFe_2O_4$], is known to be adjustable through zinc substitution—increasing the zinc content at the expense of the nickel (i.e. x in the above generic formula) decreases the Curie point. These materials also show thermo self regulation, have a high electrical resistivity that minimizes eddy current heating and are environmentally stable. This makes them potential candidates for the present application.

While the best modes for carrying out the invention have been described in detail, those familiar with the art to which this invention relates will recognize various alternative designs and embodiments for practicing the invention within the scope of the appended claims.

The invention claimed is:

1. A regulator assembly for controlling a charging process for an energy storing device, the regulator assembly comprising:
   a power bus configured for controlling a charging flow to the energy storing device;
   a contact moveable between a connected position and a disconnected position, wherein said contact is coupled to said power bus when in said connected position to permit the charging flow to the energy storing device, and said contact is de-coupled from said power bus when in said disconnected position to prevent the charging flow to the energy storing device;
   a biasing device coupled to said contact and configured for biasing said contact into one of said connected position and said disconnected position; and
   an actuator coupled to said contact and configured for moving said contact from one of said connected position and said disconnected position into the other of said connected position and said disconnected position when a feedback signal from the energy storing device is equal to or greater than a pre-determined value.

2. A regulator assembly as set forth in claim 1 wherein said feedback signal includes one of a temperature of said energy storing device, a pH level of said energy storing device and a resistance of said energy storing device.

3. A regulator assembly as set forth in claim 1 wherein said actuator includes an active material configured for moving said contact when heated or cooled to said pre-determined value.

4. A regulator assembly as set forth in claim 2 wherein said active material includes one of a shape memory alloy, a thermo-regulated magnetic element, an electro active polymer, a thermotropic liquid crystal elastomer and a shape changing polymer.

5. A regulator assembly as set forth in claim 1 further comprising a connector interconnecting said actuator and said contact.

6. A regulator assembly as set forth in claim 5 wherein said connector includes an alternate switch configured for engaging said power bus when said contact is in said disconnected position for conducting the charging flow from said power bus to another device.

7. A regulator assembly as set forth in claim 6 wherein said alternate switch includes a non-conducting insulating material.

8. A regulator assembly as set forth in claim 1 further comprising a base disposed opposite said contact with said biasing device disposed between said contact and said base.

9. A regulator assembly as set forth in claim 8 further comprising a probe attached to and extending from said base for sensing a stimuli of said energy storing device, with said actuator disposed within said probe.

10. An energy storing device comprising:
    a housing defining a cell; and
    a regulator assembly coupled to said housing and configured for controlling a charging process of said cell, the regulator assembly including:
    a power bus configured for controlling a charging flow to or from said cell;
    a contact moveable between a connected position and a disconnected position, wherein said contact is coupled to said power bus when in said connected position to permit the charging flow to or from said cell, and said contact is de-coupled from said power bus when in said disconnected position to prevent the charging flow to or from said cell;
    a biasing device coupled to said contact and configured for biasing said contact into said connected position; and
    an actuator coupled to said contact and configured for moving said contact from said connected position into said disconnected position when a feedback signal from said cell is equal to or greater than a pre-determined value, and configured for permitting said biasing device to move said contact into said connected position from said disconnected position when said feedback signal from said cell is less than said pre-determined value.

11. An energy storing device as set forth in claim 10 wherein said feedback signal includes one of a temperature of said energy storing device, a pH level of said energy storing device and a resistance of said energy storing device.

12. An energy storing device as set forth in claim 10 wherein said actuator includes an active material configured for movement when heated or cooled to said pre-determined value, wherein said active material includes one of a shape memory alloy, a thermo-regulated magnetic element, an electro active polymer, a thermotropic liquid crystal elastomer and a shape changing polymer.

13. An energy storing device as set forth in claim 12 further comprising a connector interconnecting said actuator and said contact.

14. An energy storing device as set forth in claim 13 wherein said connector includes an alternate contact configured for engaging said power bus when said contact is in said disconnected position for bypassing the charging flow around said cell and conducting the charging flow from said power bus to another device.

15. An energy storing device as set forth in claim 12 further comprising a base disposed opposite said contact with said biasing device disposed between said contact and said base.

16. A method of controlling a charging process for an energy storing device with a regulator assembly having a power bus, a contact for engaging the power bus, and an active material actuator configured for moving the contact into and out of engagement with the power bus, the method comprising:

sensing a feedback signal from the energy storing device with the active material actuator;

engaging the active material actuator to move the contact from a connected position permitting a charging flow into the energy storing device into a disconnected position preventing the charging flow into the energy storing device in response to the sensed feedback signal from the energy storing device rising to a level equal to or greater than a pre-determined value.

17. A method as set forth in claim 16 wherein the active material actuator includes one of a shape memory alloy, a thermo-regulated magnetic element, an electro active polymer, a thermotropic liquid crystal elastomer and a shape changing polymer, and engaging the active material actuator is further defined as contracting the active material actuator in response to a temperature of the active material rising to a level equal to or greater than the pre-determined value.

18. A method as set forth in claim 16 further comprising informing a vehicle controller when the sensed feedback signal rises to within a range of the pre-determined value prior to engaging the active material actuator.

19. A method as set forth in claim 18 wherein the active material actuator includes a two stage active material.

20. A method as set forth in claim 18 wherein the feedback signal includes one of a temperature of said energy storing device, a pH level of said energy storing device and a resistance of said energy storing device.

* * * * *